(12) United States Patent  
Peng et al.

(10) Patent No.: US 9,356,534 B1  
(45) Date of Patent: May 31, 2016

(54) METHOD AND APPARATUS FOR TURNING ON A LIGHTING DEVICE

(71) Applicant: Marvell International Ltd., Hamilton (BM)

(72) Inventors: Hao Peng, Sunnyvale, CA (US); Wanfeng Zhang, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 168 days.

(21) Appl. No.: 13/751,788

(22) Filed: Jan. 28, 2013

Related U.S. Application Data

(60) Provisional application No. 61/591,726, filed on Jan. 27, 2012.

(51) Int. Cl.
| | |
|---|---|
| *H05B 37/02* | (2006.01) |
| *H05B 39/04* | (2006.01) |
| *H05B 41/36* | (2006.01) |
| *H02M 7/44* | (2006.01) |
| *H02M 3/24* | (2006.01) |
| *H02M 3/335* | (2006.01) |
| *H02M 7/12* | (2006.01) |
| *H05B 33/08* | (2006.01) |

(52) U.S. Cl.  
CPC ............. *H02M 7/12* (2013.01); *H05B 33/0815* (2013.01)

(58) Field of Classification Search  
CPC ........... H05B 33/0803; H05B 33/0806; H05B 33/0809; H05B 33/0812; H05B 33/0815; H05B 33/0818; H05B 33/0845; H05B 37/02; H05B 39/08; H05B 39/02; H05B 39/04; H05B 39/083; H05B 41/3924; H05B 41/3927; H05B 39/044; Y10S 323/905; Y10S 315/04; H02M 7/12; H02M 7/217; H02M 7/537; H02M 7/53871; H02M 7/5395; H02M 5/257; H02M 5/2573; H02M 5/2576  
USPC ............. 363/131–134, 95–99, 37, 40–43, 49, 363/15–21.18, 78, 79, 89; 323/222–226, 323/271–275, 282–288, 351, 299–303, 901, 323/905, 205–211; 315/219, 224, 247, 291, 315/294, 297, 307, 360, 200, 209, 225, 246, 315/276, 287, 293, 221  
See application file for complete search history.

(56) References Cited

U.S. PATENT DOCUMENTS

| | | | |
|---|---|---|---|
| 7,505,287 B1 * | 3/2009 | Kesterson | 363/21.01 |
| 7,719,248 B1 * | 5/2010 | Melanson | 323/283 |
| 2010/0141173 A1 * | 6/2010 | Negrete | 315/294 |
| 2012/0119650 A1 * | 5/2012 | Lee | 315/122 |
| 2012/0319604 A1 * | 12/2012 | Walters | 315/200 R |

* cited by examiner

*Primary Examiner* — Timothy J Dole  
*Assistant Examiner* — Carlos Rivera-Perez (57) ABSTRACT

Aspects of the disclosure provide a method. The method includes regulating a time for turning on a switch to transfer energy via a transformer in a first control mode, determining a turn-on time for a second control mode based on the regulated time in the first control mode, and controlling the switch based on the determined turn-on time in the second control mode to transfer energy via the transformer.

17 Claims, 6 Drawing Sheets

METHOD AND APPARATUS FOR TURNING ON A LIGHTING DEVICE

INCORPORATION BY REFERENCE

This present disclosure claims the benefit of U.S. Provisional Application No. 61/591,726, "Control Algorithm for Smooth Turn On of the LED Lamp without a Phase Cut Dimmer" filed on Jan. 27, 2012, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Light emitting diode (LED) lighting devices provide the advantages of low power consumption and long service life. Thus, LED lighting devices may be used as general lighting equipment in the near future to replace, for example, fluorescent lamps, bulbs, halogen lamps, and the like.

SUMMARY

Aspects of the disclosure provide a method. The method includes regulating a time for turning on a switch to transfer energy via a transformer in a first control mode, determining a turn-on time for a second control mode based on the regulated time in the first control mode, and controlling the switch based on the determined turn-on time in the second control mode to transfer energy via the transformer.

In an embodiment, to regulate the time for turning on the switch to transfer energy via the transformer in the first control mode, the method includes regulating the time for turning on the switch to transfer energy with a substantially constant peak current. In an example, the method includes generating pulses with a pulse width modulated based on a sensed current.

To determine the turn-on time for the second control mode based on the regulated time in the first control mode, in an example, the method includes searching a minimum turn-on time in the first control mode, and determining the turn-on time for the second control mode based on the minimum turn-on time. For example, the method includes counting based on a clock signal in response to pulses in a pulse width modulation (PWM) signal that controls the switch, and searching a minimum counted value in the first control mode.

To determine the turn-on time for the second control mode based on the regulated time in the first control mode, the method includes determining the turn-on time for the second control mode based on the regulated time in the first control mode to transfer substantially the same amount of energy during an AC cycle in the first control mode and in the second control mode.

Aspects of the disclosure provide a circuit that includes a controller. The controller is configured to regulate a time for turning on a switch to transfer energy via a transformer in a first control mode, determine a turn-on time for a second control mode based on the regulated time in the first control mode, and control the switch based on the determined turn-on time in the second control mode to transfer energy via the transformer.

Aspects of the disclosure also provide an apparatus. The apparatus includes an energy transfer module and a controller. The energy transfer module is configured to transfer electric energy from a power supply to an output device. The controller is configured to regulate a time for turning on a switch in the energy transfer module to transfer energy in a first control mode, determine a turn-on time for a second control mode based on the regulated time in the first control mode, and control the switch based on the determined turn-on time in the second control mode to transfer energy.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
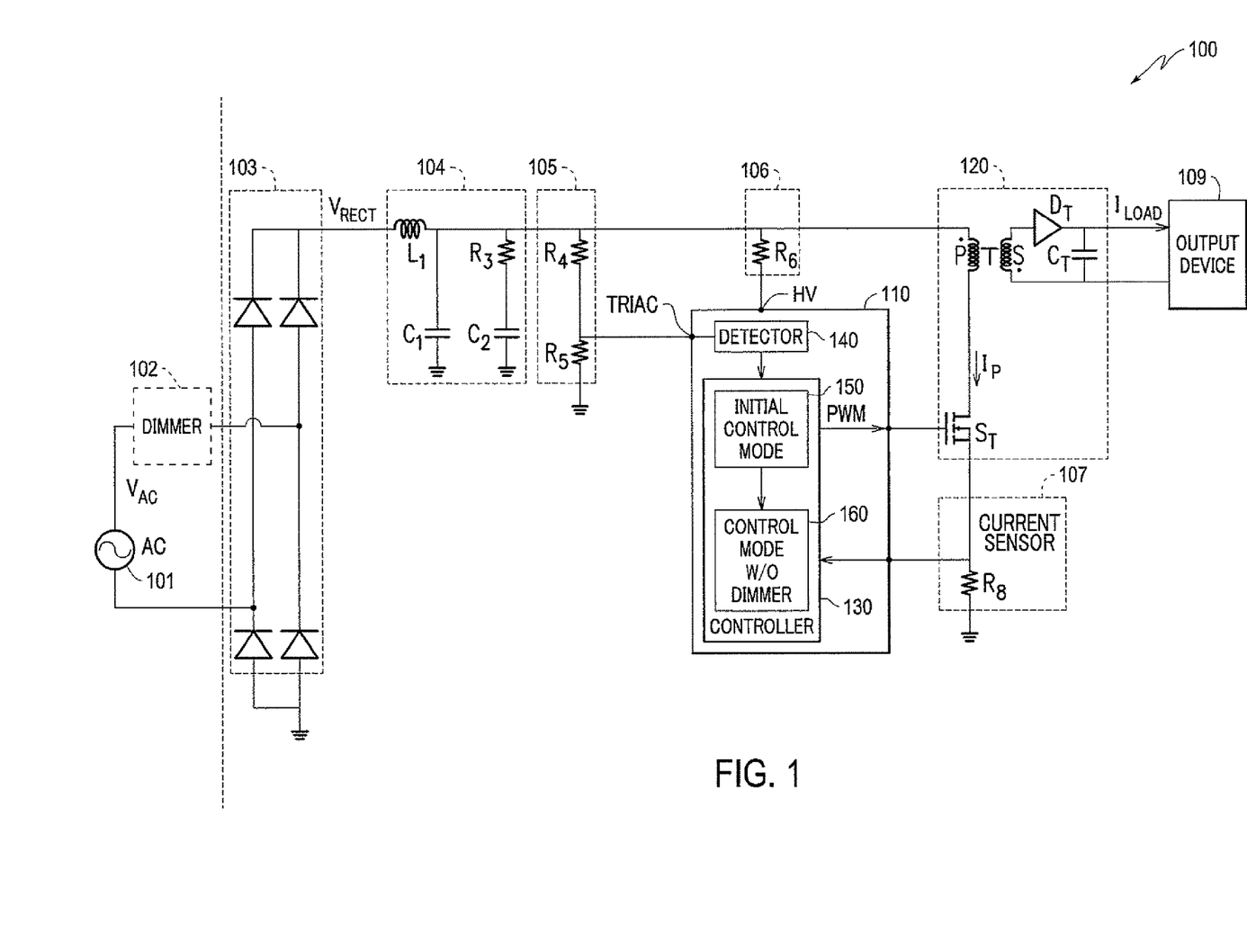
FIG. 1 shows a block diagram of an electronic system 100 according to an embodiment of the disclosure.

FIG. 1 shows a block diagram of an electronic system 100 according to an embodiment of the disclosure. The electronic system 100 operates based on an alternating current (AC) voltage $V_{AC}$ provided by an AC power supply 101 with or without a dimmer 102. The AC voltage $V_{AC}$ can be 110V 50 Hz AC supply voltage, 220V 60 Hz AC supply voltage, and the like.

According to an aspect of the disclosure, the electronic system 100 is operable with or without a dimmer 102. When a dimmer 102 exists, the dimmer 102 includes a triode for alternating current (TRIAC) having an adjustable dimming angle α. The dimming angle α defines a size of a phase-cut range during which the TRIAC is turned off. During an AC cycle, when the phase of the AC voltage $V_{AC}$ is in the phase-cut range, the TRIAC is turned off. Thus, an output voltage of the dimmer 102 is about zero. When the phase of the AC voltage $V_{AC}$ is out of the phase-cut range, the TRIAC is turned on. Thus, the output voltage of the dimmer 102 is about the same as the AC voltage $V_{AC}$.

In an embodiment, the electronic system 100 is configured to detect whether the dimmer 102 exists, and to operate accordingly to achieve improved performance in either situations. For example, when the dimmer 102 exists, the electronic system 100 is configured to support the operations of the dimmer 102, such as disclosed in Assignee's co-pending U.S. patent application Ser. No. 13/676,884, filed Nov. 14, 2012, which is incorporated herein by reference in its entirety. When the dimmer 102 does not exist, the electronic system 100 is configured to perform power factor correction (PFC) and total harmonic distortion (THD) reduction to improve energy efficiency, for example.

According to an embodiment of the disclosure, the electronic system 100 has multiple operation modes, such as a first operation mode and a second operation mode, and operates in one of the multiple operation modes based on existence of the dimmer 102. When the dimmer 102 exists, the electronic system 100 operates in the first operation mode to support the operations of the dimmer 102. When the dimmer 102 does not exist, the electronic system 100 operates in the second operation mode to improve energy efficiency.

During operation, in an example, at power-up, the electronic system 100 enters an initial operation mode. In the initial operation mode, the electronic system 100 detects whether the dimmer 102 exists, and accordingly determines the suitable operation mode to enter. In addition, the electronic system 100 can determine suitable values of operational parameters for the operation mode considering a smooth transition from the initial operation mode to the suitable operation mode and considering various variations in the system. Then, the electronic system 100 enters the suitable operation mode and configures the operational parameters using the determined values to enable a smooth turn-on of the electronic system 100.

It is noted that the initial operation mode can be one of the first operation mode and the second operation mode. In an example, at power-up, the electronic system 100 enters the first operation mode assuming that the dimmer 102 exists. It is noted that when the dimmer 102 does not exists, the electronic system 100 is operable in the first operation mode, but may have a relatively low power factor and a relatively large total harmonic distortions. When the electronic system 100 detects that the dimmer 102 does not exist, the electronic system 100 enters the second operation mode with suitable values for the operational parameters to enable a smooth transition from the first operation mode to the second operation mode, for example, without being noticeable to a user.

In the FIG. 1 example, the electronic system 100 includes a rectifier 103, a damping circuit 105, a circuit 110, an energy transfer module 120, a current sensor 107, and an output device 109. These elements are coupled together as shown in FIG. 1.

The rectifier 103 rectifies an AC voltage to a fixed polarity, such as to be positive. In the FIG. 1 example, the rectifier 103 is a bridge rectifier. The bridge rectifier 103 receives the AC voltage, or the output voltage of the dimmer 102, and rectifies the received voltage to a fixed polarity, such as to be positive. The damping circuit 104 is configured to filter out high frequency components and smooth the rectified voltage $V_{RECT}$. The rectified voltage $V_{RECT}$ is provided to following circuits, such as the circuit 110, the energy transfer module 120, and the like, in the electronic system 100.

The energy transfer module 120 transfers electric energy provided by the rectified voltage $V_{RECT}$ to the output device 109 under the control of the circuit 110. In the FIG. 1 example, the energy transfer module 120 includes a transformer T and a switch $S_T$. The energy transfer module 120 also includes other suitable components, such as a diode $D_T$, a capacitor $C_T$, and the like. The transformer T includes a primary winding (P) coupled with the switch $S_T$ to receive the rectified voltage $V_{RECT}$ and a secondary winding (S) coupled to the output device 109 to drive the output device 109.

In an embodiment, the circuit 110 provides control signals to control the operations of the switch $S_T$ to transfer the electric energy from the primary winding to the secondary winding. In an example, the circuit 110 provides a pulse width modulation (PWM) signal with pulses having a relatively high frequency, such as in the order of 100 KHz, and the like, to control the switch $S_T$.

Specifically, in an example, when the switch $S_T$ is switched on, a current $I_P$ flows through the primary winding of the transformer T, and the switch $S_T$. The polarity of the transformer T and the direction of the diode $D_T$ can be arranged such that there is no current in the secondary winding of the transformer T when the switch $S_T$ is switched on. Thus, the received electric energy is stored in the transformer T.

When the switch $S_T$ is switched off, the current $I_P$ becomes zero. The polarity of the transformer T and the direction of the diode $D_T$ can enable the secondary winding to deliver the stored electric energy to the capacitor $C_T$ and the output device 109. The capacitor $C_T$ can filter out the high frequency components and enable a relatively stable load current $I_{LOAD}$ to be driven to the output device 109.

The output device 109 can be any suitable device, such as a lighting device, a fan and the like. In an embodiment, the output device 109 includes a plurality of light emitting diodes (LEDs). The output device 109 and the other components of the electronic system 100 are assembled into a package to form an LED lighting device to replace, for example, a fluorescent lamp, a halogen lamp, and the like.

The current sensor 107 is configured to sense the current $I_P$ flowing through the primary winding, and provide the sensed current to the circuit 110. In an example, the current sensor 105 includes a resistor having a relatively small resistance such that a voltage drop on the resistor is small compared to the rectified voltage $V_{RECT}$. The voltage drop is indicative of the current $I_P$. In an example, the voltage drop is provided to the circuit 110 as the sensed current.

It is noted that the electronic system 100 also includes other sensor circuits. For example, the electronic system 100 includes a triode for alternating current (TRIAC) sensor 105, and a high voltage sensor 106. The TRIAC sensor 105 is configured to provide a voltage signal to the circuit 110 to detect whether a TRIAC type dimmer exists. The high voltage sensor 106 is configured to provide a voltage signal to the circuit 110 to monitor the voltage level at the input of the energy transfer module 120.

According to an embodiment of the disclosure, the circuit 110 includes a detector 140 and a controller 130. The detector 140 is configured to receive signals provided by sensors, such as the TRIAC sensor 105, the high voltage sensor 106, and the like, and detect various parameters from the signals, such as existence of a TRIAC type dimmer, and the like. The controller 130 is configured to adjust control signals, such as the PWM signal, and the like, based on the detected parameters to control the operations of the energy transfer module 120.

Specifically, in an example, the controller 130 has multiple control modes that generate the PWM signal according to different algorithms. In an example, the controller 130 has an initial control mode 150 that generates the PWM signal according to a first algorithm, and has a control mode 160 that generates the PWM signal according to a second algorithm. In this example, the first algorithm is used to generate the PWM signals to enable the operations of the dimmer 102, and the second algorithm is used to generate the PWM signal to achieve improved power factor and total harmonic distortion when the dimmer 102 does not exist.

In an embodiment, according to the first algorithm, the controller 130 provides the PWM signal to the switch $S_T$ to maintain a relatively constant peak current in the primary winding when the TRIAC in the dimmer 102 is turned on. In an example, when the controller 130 detects that the TRIAC in the dimmer 102 is turned on, the controller 130 provides the PWM signal to the switch $S_T$ to repetitively turn on and off the switch $S_T$ to maintain the relatively constant peak current. For example, at a time, the controller 130 changes the PWM signal from "0" to "1" to turn on the switch $S_T$. When the switch $S_T$ is turned on, the current $I_P$ starts to increase. The current sensor 107 senses the current $I_P$, for example, in a form of a voltage drop on a resistor, and provides sensed voltage drop to the controller 130. The controller 130 receives the sensed voltage drop, and changes the PWM signal from "1" to "0" to turn off the switch $S_T$ when the sensed voltage drop is substantially equal to a threshold, such as 0.4V, and the like.

In an example, the first algorithm is implemented as a state machine to detect the on/off state of the TRIAC based on the sensed current $I_P$ and then generates the PWM signal according to the detected state, such as disclosed in Assignee's co-pending U.S. patent application Ser. No. 13/676,884, filed Nov. 14, 2012, which is incorporated herein by reference in its entirety.

Further, in the embodiment, according to the second algorithm, the controller 130 provides the PWM signal to control the switch $S_T$ to have a relatively constant turn-on time over the switching cycles in an AC cycle. For example, in an AC cycle, the PWM signal includes pulses to repetitively switch on and off the switch $S_T$. The controller 130 can maintain the pulses in the PWM signal to have the same pulse width during the AC cycle, such that the turn-on time of the switch $S_T$ over the switching cycles in the AC cycle is about the same. It is noted that, according to an aspect of the disclosure, the turn-on time in different AC cycles can be different. In an example, the turn-on time and switching frequency are fixed during an AC cycle, but are adaptively changed over time.

Figure 2:
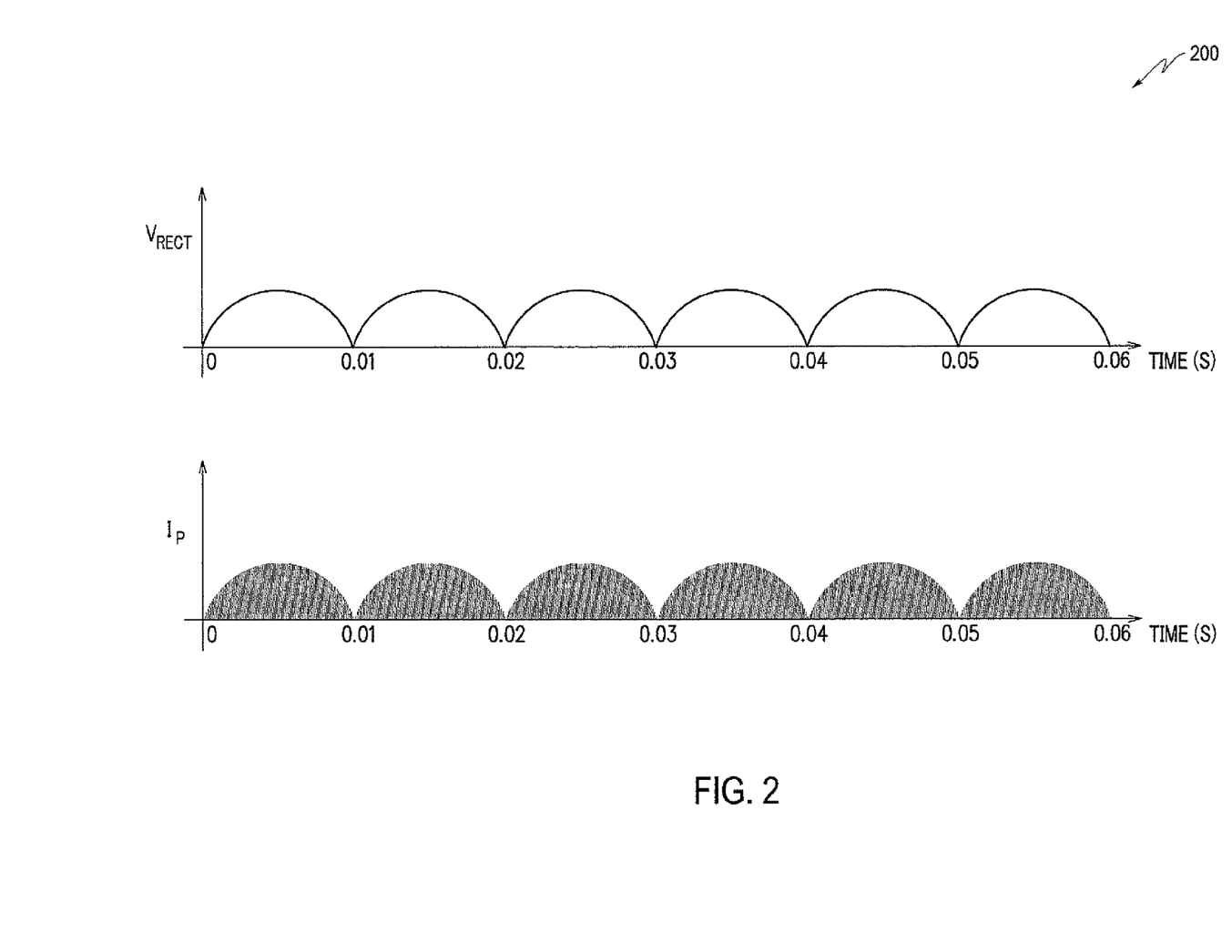
FIG. 2 shows a plot 200 of voltage and current waveforms according to an embodiment of the disclosure.

FIG. 2 shows a plot 200 of voltage and current waveforms for the electronic system 100 when the dimmer 102 does not exist and the controller 130 is in the control mode 160 and performs the second algorithm. The plot 200 includes a first waveform for the rectified voltage $V_{RECT}$ and a second waveform for the current $I_P$.

The first waveform shows that the rectified voltage $V_{RECT}$ has a rectified sinusoidal curve. The second waveform shows that the peak current of the switching cycles follows the shape of the first waveform due to the fixed turn-on time for the control mode 160 during an AC cycle. Thus, the average of the current $I_P$ has substantially the same phase as the rectified voltage $V_{RECT}$, and the power factor correction can be achieved, and the energy efficiency can be improved.

Figure 3:
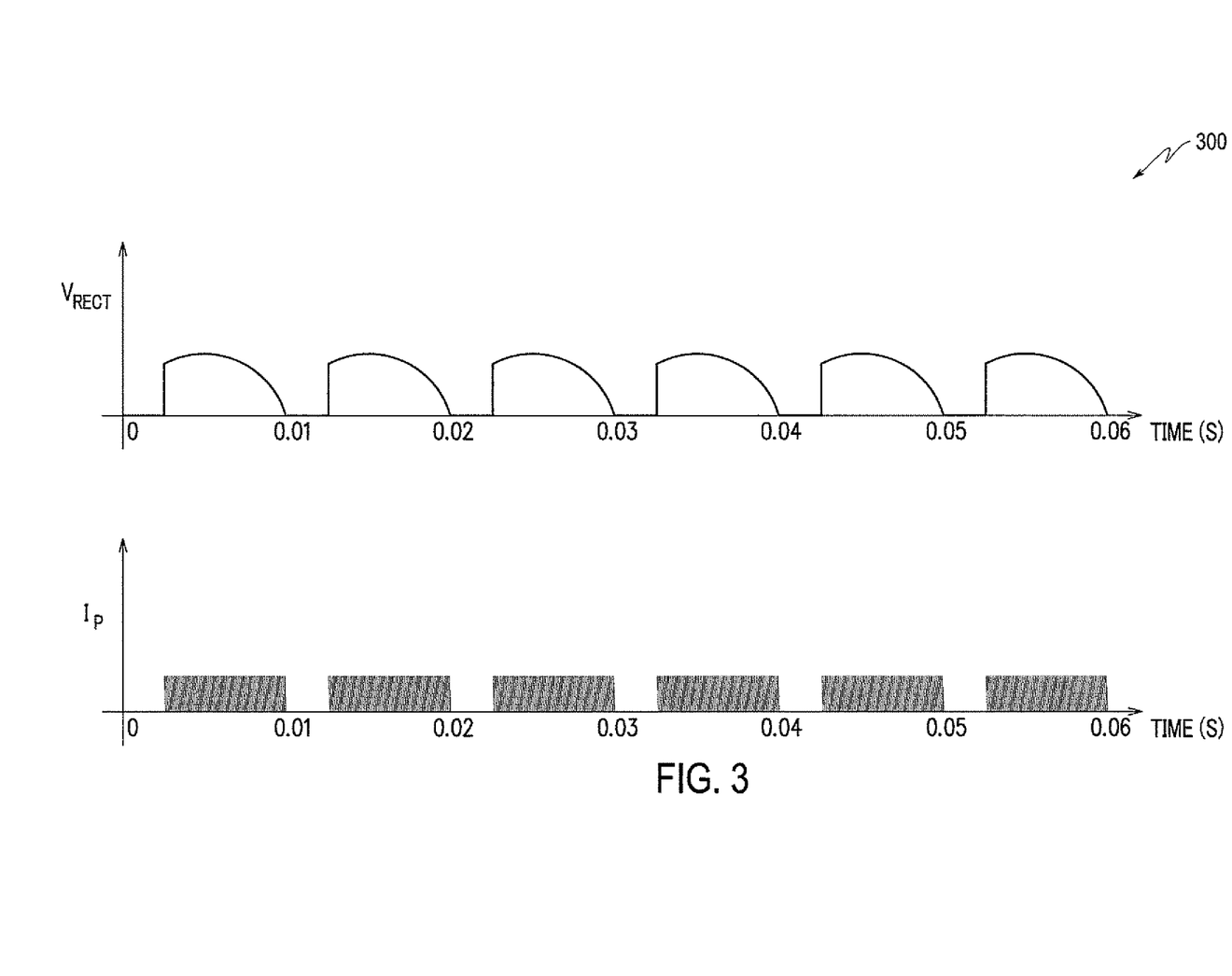
FIG. 3 shows a plot 300 of voltage and current waveforms according to an embodiment of the disclosure.

FIG. 3 shows a plot 300 of voltage and current waveforms for the electronic system 100 when the dimmer 102 exists, and the controller 130 is in the initial control mode 150 and performs the first algorithm. The plot 300 includes a first waveform for the rectified voltage $V_{RECT}$ and a second waveform for the current $I_P$.

The first waveform shows that the rectified voltage $V_{RECT}$ can be zero during a phase-cut range when the TRIAC in the dimmer 102 is turned off. The second waveform 320 shows that the peak current in the switching cycles is about the same in an AC cycle due to the constant peak current control of the initial control mode 150.

It is also noted that the controller 130 also controls the PWM signal based on other parameters. For example, according to the first algorithm, the controller 130 can control the PWM signal based on, for example, a maximum on time (i.e., 10 μs), a minimum frequency (i.e., 70 KHz), a maximum frequency (i.e., 200 KHz), and the like.

Further, in an example, according to the second algorithm, the controller 130 limits a maximum peak current in the primary winding. For example, the current sensor 107 senses the current $I_P$, and provides a sensed voltage drop indicative of the current $I_P$, to the controller 130. In a switching cycle, when the controller 130 changes the PWM signal from "0" to "1" to turn on the switch $S_T$, the sensed voltage drop is monitored. When the sensed voltage drop is lower than a threshold, such as 0.6V, the controller 130 changes the PWM signal from "1" to "0" to turn off the switch $S_T$ in a manner to maintain the relatively constant turn-on time. When the sensed voltage is equal or above the threshold, the controller 130 changes the PWM signal from "1" to "0" to turn off the switch $S_T$ earlier than the constant turn-on time to avoid the current $I_P$ to further increase.

In another example, according to the second algorithm, the controller 130 uses a quasi-resonant control method. According to the quasi-resonant control method, a frequency of the PWM signal is not fixed, and is synchronized with a resonance frequency governed by inductance and capacitance in the electronic system 100. In this example, a voltage across the secondary winding of the transformer T is sensed and provided to the controller 130. When the switch $S_T$ is turned off, the voltage across the secondary winding resonates. The controller 130 changes the PWM signal from "0" to "1" when the voltage across the secondary winding is at the valley.

According to an aspect of the disclosure, due to the difference in the control algorithms, when the controller 130 switches from one control mode to another control mode, the transition can be noticeable and can affect user experience. For example, when the dimmer 102 does not exist, the controller 130 changes from the initial control mode 150 to the control mode 160. When the two control modes control the energy transfer module 120 to deliver significantly different energy per AC cycle to the output device 109, the LEDs in the output device 109 may flash at the time of control mode transition, and cause unpleasant user experience during the transition.

In addition, various variations in the power supply and the electronic system 100 may also cause smooth transition to be challenging. For example, the AC voltage $V_{AC}$ may vary from 90V AC voltage to 135V AC voltage, the inductance in the electronic system 100 may have over 20% variation, and a frequency of a system clock used by the circuit 110 may have over 20% variation.

According to an embodiment of the disclosure, during the initial control mode 150, the controller 130 determines suitable values for operational parameters for the control mode 160 based on the values in the initial control mode 150 to enable the energy transfer module 120 to transfer about the same amount of energy per AC cycle during the transition from the initial control mode 150 to the control mode 160. As a result, the LEDs emit about the same amount of light during the transition, and thus the transition is not noticeable.

In an example, the controller 130 is configured to search for a minimum turn-on time during the initial control mode 150, and then determines the initial turn-on time for the control mode 160 based on the minimum turn-on time. For example, the controller 130 includes a counter circuit (not shown) that counts in response to pulses in the PWM signal during the initial control mode 150. The counter circuit can count based on a system clock used by the circuit 110. In an example, the counter circuit starts counting from zero in response to a leading edge of a pulse, and stops counting in response to a trailing edge of the pulse. The counted value is indicative of the pulse width, and is indicative of the turn-on time of the switch $S_T$. Because the turn-on time of the switch $S_T$ is a function of the inductance and the voltage level of the power supply, and the counter circuit counts based on the system clock, the variations in the inductance, voltage level of the power supply and the system clock have been taken account into the counted value.

Based on the counted values in one or more AC cycles, the controller 130 searches a minimum counted value. Based on the minimum counted value, the controller 130 determines a counting value for the control mode 160 that can be used to control the turn-on time of the switch $S_T$ in a switch cycle.

In an example, the counting value is determined to match the transferred energy per AC cycle for the initial control mode 150 and the control mode 160. In an example, the counting value is about one and a half of the minimum counted value. Accordingly, the maximum peak current in the control mode 160 is one and a half of the peak current in the initial control mode 150, and the maximum delivered energy in a switching cycle is about twice of the energy delivered in a switching cycle of the initial control mode 150. During the initial one or more AC cycles of the control mode 160, the controller 130 can use the same switching frequency as the last switching frequency of the initial control mode 150. Further, because the minimum energy delivered in a switching cycle is zero in the control mode 160, thus the average transferred energy per AC cycle is about the same for the initial control mode 150, and the initial AC cycles of the control mode 160.

According to an aspect of the disclosure, in the control mode 160, the controller 130 generates the PWM signal based on the determined counting value for one or more initial AC cycles to enable smooth transition. For example, when the controller 130 generates a leading edge of a pulse, the counter circuit starts counting from zero for example. When the counter circuit counts to the determined counting value, the controller 130 generates the trailing edge of the pulse. It is noted that the counting value can be adaptively changed after the initial AC cycles in the control mode 160.

It is noted that the electronic system 100 can be implemented using one or more integrated circuit (IC) chips. In an example, the circuit 110 is implemented as a single IC chip. Further, the switch $S_T$ can be implemented as a discrete device or can be integrated with the circuit 110 on the same IC chip. The controller 130 can be implemented as circuits or can be implemented as a processor executing instructions.

Figure 4:
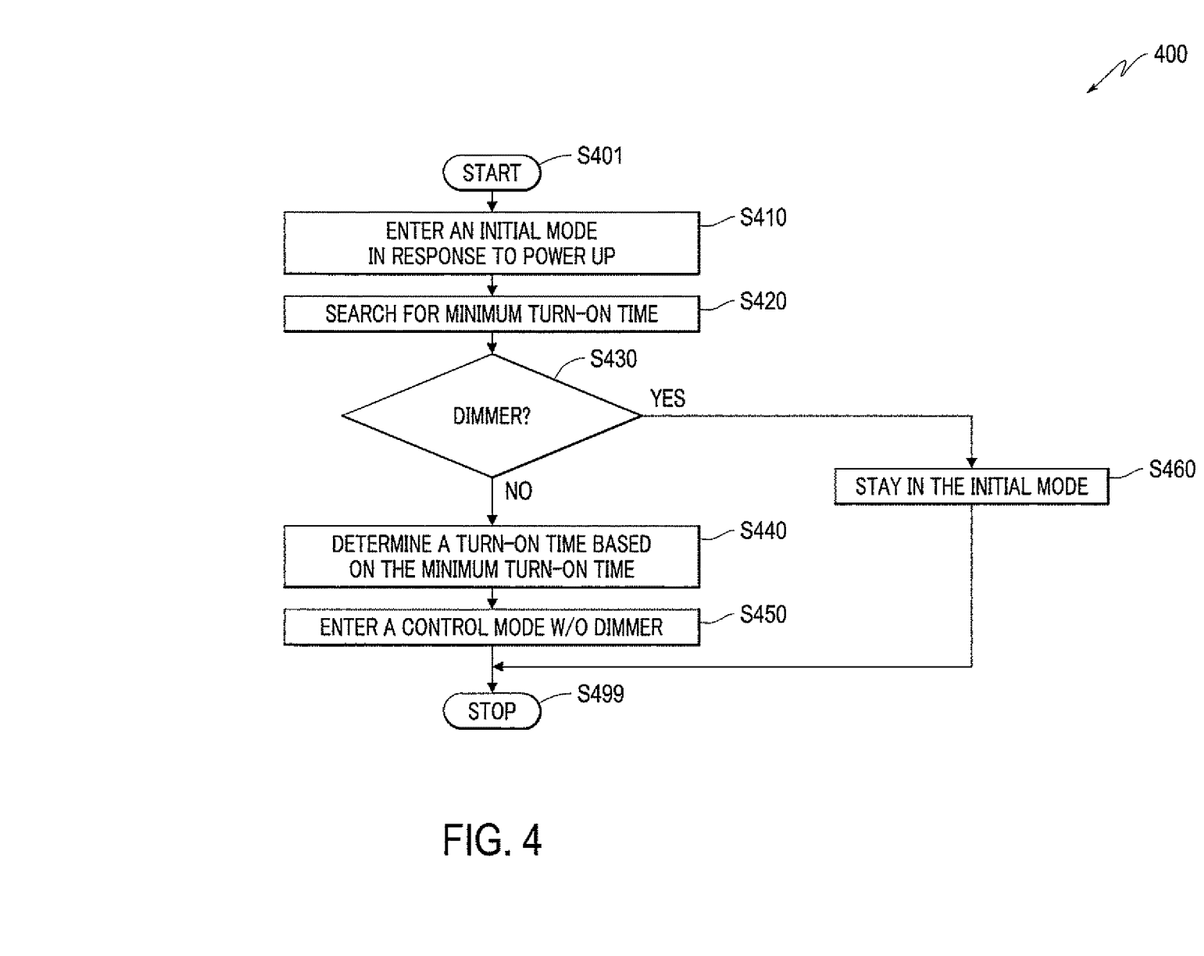
FIG. 4 shows a flowchart outlining a process example according to an embodiment of the disclosure.

FIG. 4 shows a flowchart outlining a process example 400 executed by the controller 130 according to an embodiment of the disclosure. The process starts at S401 and proceeds to S410.

At S410, the electronic system 100 is powered up, and the controller 130 enters the initial control mode 150. In an example, in the initial control mode 150, the controller 130 generates a PWM signal according to the first algorithm, which is based on using a constant peak current to drive the energy transfer module 110 to enable the operations of the dimmer 102 assuming the dimmer 102 exists.

At S420, the controller 130 searches for a minimum turn-on time. In an example, the controller 130 includes a counter circuit to count in response to pulses in the PWM signal during the initial control mode 150. The counter circuit can count based on the system clock used by the circuit 110. In an example, in a switching cycle, the counter circuit starts counting in response to a leading edge of a pulse, and stops counting in response to a trailing edge of the pulse. The counted value is indicative of the pulse width, and is indicative of the turn-on time of the switch $S_T$ in the switching cycle. Then, the controller 130 searches for a minimum counted value in one or more AC cycles. The minimum counted value is indicative of the minimum turn-on time.

At S430, the controller 130 determines whether the dimmer 102 exists. In an example, the controller 130 includes a state machine to implement control functions of the initial control mode 150. The state machine detects the on or off state of the TRIAC in the dimmer 102. When a TRIAC off state has been consistently detected, the controller 130 determines that the dimmer 102 exists; and when the TRIAC off state is not detected for one or more AC cycles, the controller 130 determines that the dimmer 102 does not exist. When the dimmer 102 exists, the process proceeds to S460 that the controller 130 stays in the initial control mode 150; otherwise, the process proceeds to S440.

At S440, the controller 130 determines a turn-on time for the control mode 160 based on the minimum turn-on time from the initial control mode 150. In an example, the controller 130 determines a counting value indicative of the turn-on time based on the minimum counted value. For example, the counting value is about one and a half of the minimum counted value.

At S450, the controller 130 enters the control mode 160 to generate the PWM signal based on the determined turn-on time for one or more initial AC cycles. In an example, during an initial AC cycle, when the controller 130 generates a leading edge of a pulse, the counter circuit starts counting from zero for example. When the counter circuit counts to the determined counting value, the controller 130 generates the trailing edge of the pulse. Because the counting value is one and a half of the minimum counted value, the maximum peak current in the control mode 160 is about one and a half of the peak current in the initial control mode 150, and the maximum delivered energy in a switching cycle is about twice the delivered energy in a switching cycle of initial control mode 150. In addition, the minimum delivery energy in the control mode 160 is about zero. When the switching frequency is about the same for the initial AC cycle in the control mode 160 and the initial control mode 150, the average transferred energy per AC cycle is about the same for the initial control mode 150, and the initial AC cycle of the control mode 160. Thus, the LEDs emit about the same amount of light during the initial AC cycle of the control mode 160 and during the initial control mode 150, and the transition from the initial control mode 150 to the control mode 160 can be smooth and not noticeable. Then the process proceeds to S499 and terminates.

Figure 5:
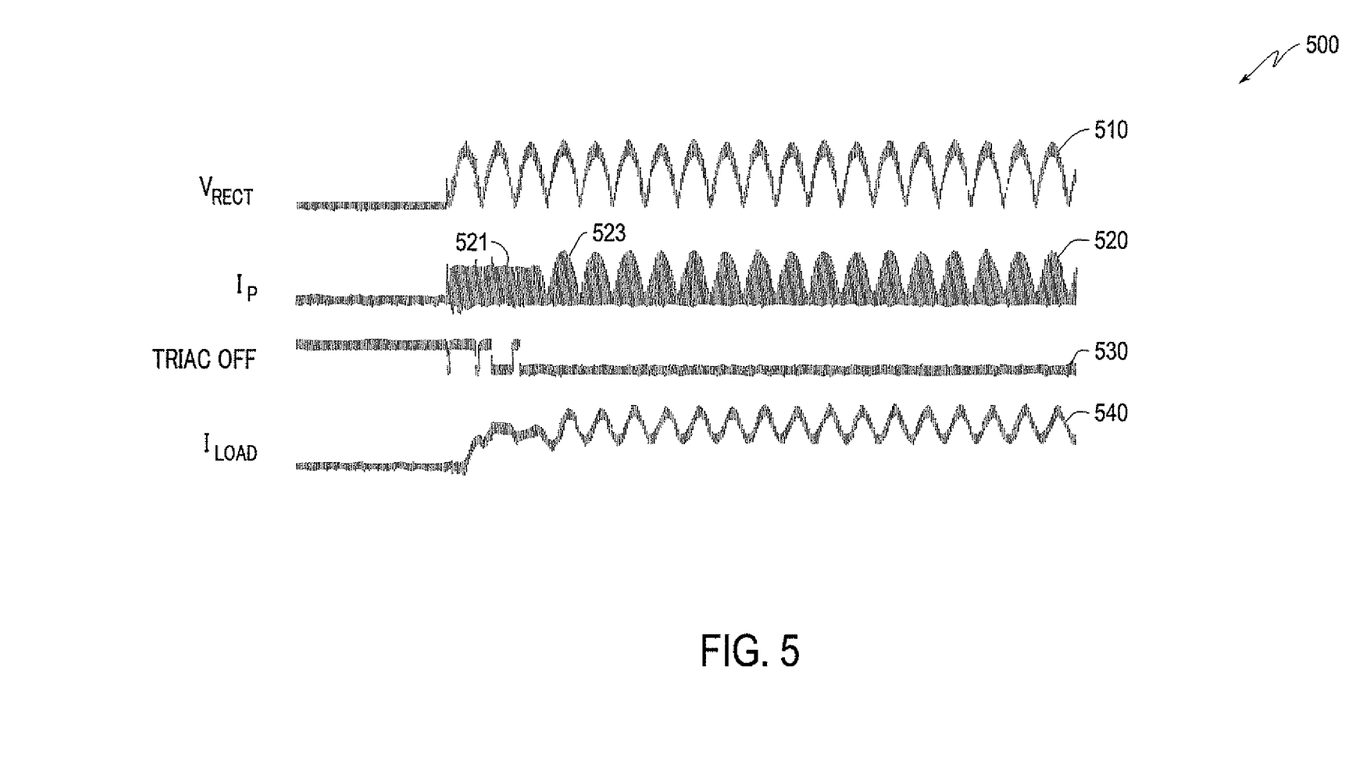
FIGS. 5 and 6 show waveforms of an electronic system with voltage variation according to an embodiment of the disclosure.

FIG. 5 shows a plot 500 of simulation waveforms for the electronic system 100 with 120V AC input voltage. The plot 500 includes a first waveform 510 for the rectified voltage $V_{RECT}$, a second waveform 520 for the current $I_P$, a third waveform 530 for a signal (TRIAC OFF) in the electronic system 100 that is indicative of TRIAC on/off state, and a fourth waveform 540 for the load current $I_{LOAD}$ to the output device 109.

At power up, during the first three half AC cycles, the controller 130 is in the initial control mode 150 and the electronic system 100 is in the first operation mode to support the operations of the dimmer 102 assuming the dimmer 102 exists. In the initial control mode 150, the controller 130 generates the PWM signal to turn on and off the switch $S_T$ to maintain a relatively constant peak current, as shown by 521. Further, in the initial control mode 150, the controller 130 searches for a minimum turn-on time. Based on the minimum turn-on time, the controller 130 determines a turn-on time for the control mode 160.

In the FIG. 5 example, the controller 130 detects the on/off state of the TRIAC based on the TRIAC OFF signal. When the TRIAC OFF signal indicates no TRIAC off state for half an AC cycle for example, the controller 130 determines that the dimmer 102 does not exist and switches to the control mode 160. The electronic system 100 then operates in the second operation mode to improve energy efficiency. For example, the average current $I_P$ has about the same phase as the rectified voltage $V_{RECT}$, as can be seen by 523, and the energy efficiency can be improved.

In the initial cycles of the control mode 160, the controller 130 generates the PWM signal based on the determined turn-on time to enable a smooth transition from the initial control mode 150 to the control mode 160. As can be see, the average load current $I_{LOAD}$ per AC cycle is about the same before and after the transition.

Figure 6:
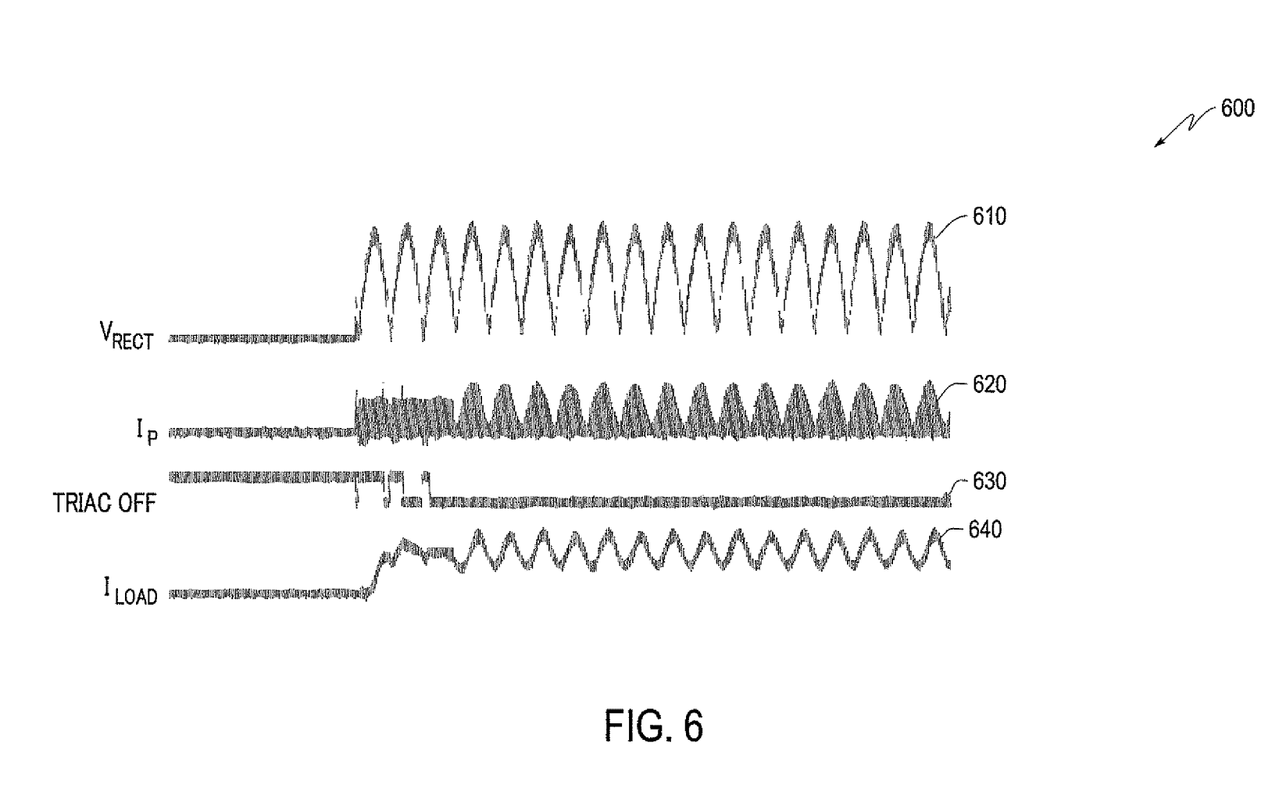

FIG. 6 shows a plot 600 of simulation waveforms for the electronic system 100 with 230V AC input voltage. Similar to the waveforms in FIG. 5, the average load current $I_{LOAD}$ per AC cycle is about the same before and after the transition. According to an embodiment of the disclosure, because the minimum turn-on time in the initial control mode 150 is a function of the input voltage, when the turn-on time for the control mode 150 is determined based on the minimum turn-on time, the voltage variation is taken into consideration in the turn-on time, and the smooth transition from the initial control mode 150 to the control mode 160 can be performed.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   regulating a time for turning on a switch to transfer energy via a transformer in a first control mode;
   determining a first turn-on time for the switch in the first control mode based on the regulated time in the first control mode;
   generating a count per a cycle, based on a clock signal in response to pulses in a pulse width modulation (PWM) signal that controls the switch;
   searching a minimum counted value among counts generated over a plurality of cycles;
   determining whether a dimmer is coupled with the switch or not;
   determining a second turn-on time for the switch in a second control mode based on the searched minimum counted value; and
   controlling the switch based on the determined second turn-on time in the second control mode to transfer energy via the transformer, wherein the second turn-on time in the second control mode is a constant turn-on time for the switch only when the dimmer is decoupled with the switch.

2. The method of claim 1, wherein regulating the time for turning on the switch to transfer energy via the transformer in the first control mode further comprises:
   regulating the time for turning on the switch to transfer energy with a constant peak current.

3. The method of claim 2, wherein regulating the time for turning on the switch to transfer energy with the constant peak current further comprises:
   generating pulses with a pulse width modulated based on a sensed current.

4. The method of claim 1, wherein determining the second turn-on time for the second control mode based on the first turn-on time in the first control mode further comprises:
   searching a minimum turn-on time in the first control mode; and
   determining the second turn-on time for the second control mode based on the minimum turn-on time.

5. The method of claim 1, wherein determining the second turn-on time for the second control mode based on the first turn-on time in the first control mode further comprises:
   determining the second turn-on time for the second control mode based on the first turn-on time in the first control mode to transfer the same amount of energy during an AC cycle in the first control mode and in the second control mode.

6. The method of claim 1, wherein controlling the switch based on the determined second turn-on time in the second control mode to transfer energy via the transformer further comprises:
   controlling the switch based on the determined second turn-on time during an initial AC cycle in the second control mode.

7. A circuit including a controller configured to:
   regulate a time for turning on a switch to transfer energy via a transformer in a first control mode;
   determine a first turn-on time for the switch in the first control mode based on the regulated time in the first control mode;
   generate a count per a cycle, based on a clock signal in response to pulses in a pulse width modulation (PWM) signal that controls the switch;
   search a minimum counted value among counts generated over a plurality of cycles;
   determine whether a dimmer is coupled with the switch or not;
   determine a second turn-on time for the switch in a second control mode based on the searched minimum counted value; and
   control the switch based on the determined second turn-on time in the second control mode to transfer energy via the transformer, wherein the second turn-on time in the second control mode is a constant turn-on time for the switch only when the dimmer is decoupled with the switch.

8. The circuit of claim 7, wherein the controller is configured to regulate the time for turning on the switch to transfer energy with a constant peak current.

9. The circuit of claim 8, wherein the controller is configured to generate pulses with a pulse width modulated based on a sensed current.

10. The circuit of claim 7, wherein the controller is configured to:
    search a minimum turn-on time in the first control mode; and
    determine the second turn-on time for the second control mode based on the minimum turn-on time.

11. The circuit of claim 7, wherein the controller is configured to determine the second turn-on time for the second control mode based on the first turn-on time in the first control mode to transfer the same amount of energy in the first control mode and in the second control mode during an AC cycle.

12. The circuit of claim 7, wherein the controller is configured to control the switch based on the determined second turn-on time during an initial AC cycle in the second control mode.

13. An apparatus, comprising:
    an energy transfer module configured to transfer electric energy from a power supply to an output device; and
    a controller configured to regulate a time for turning on a switch in the energy transfer module to transfer energy in a first control mode, determine a first turn-on time for the switch in the first control mode based on the regulated time in the first control mode, generate a count per a cycle, based on a clock signal in response to pulses in a pulse width modulation (PWM) that controls the switch, search a minimum counted value among counts generated over a plurality of cycles, determine whether a dimmer is coupled with the switch or not, determine a second turn-on time for the switch in a second control mode based on the searched minimum counted value, and control the switch based on the determined second turn-on time in the second control mode to transfer energy, wherein the second turn-on time in the second control mode is a constant turn-on time for the switch only when the dimmer decoupled with the switch.

14. The apparatus of claim 13, wherein the controller is configured to regulate the time for turning on the switch to transfer energy with a constant peak current.

15. The apparatus of claim 14, wherein:
- a current sensor is configure to sense a current flowing through the energy transfer module; and
- the controller is configured to generate pulses with a pulse width modulated based on the sensed current.

16. The apparatus of claim 13, wherein the controller is configured to:
- search a minimum turn-on time in the first control mode; and
- determine the second turn-on time for the second control mode based on the minimum turn-on time.

17. The apparatus claim 13, wherein the controller is configured to determine the second turn-on time for the second control mode based on the first turn-on time in the first control mode to transfer the same amount of energy in the first control mode and in the second control mode during an AC cycle.

\* \* \* \* \*